July 12, 1949.  H. D. MORRIS ET AL  2,475,633
FOLDING CORNER REFLECTOR
Filed Jan. 18, 1945

INVENTOR.
HENRY D. MORRIS
CONRAD. H. ZIERDT, JR.
BY William D. Hall.
ATTORNEY

UNITED STATES PATENT OFFICE 2,475,633

FOLDING CORNER REFLECTOR

Henry D. Morris and Conrad H. Zierdt, Jr., Dayton, Ohio

Application January 18, 1945, Serial No. 573,400

7 Claims. (Cl. 343—18)

(Granted under the act of March 3, 1883, as amended April 30, 1928; 370 O. G. 757)

The invention described herein may be manufactured and used by or for the Government for governmental purposes, without the payment to us of any royalty thereon.

The invention to be hereinafter described relates to corner reflectors used in radar.

It is well known that most bodies reflect incident radio waves in varying degrees. This fact is the basis of detecting systems used in locating targets by radar equipment. This fact also enables various methods of, and devices for, confusing radar detection of definite location of a given object or target whether stationary or moving.

Briefly, in radar detection of a target, the radar transmits radio waves in the form of a beam which may be directed as desired and an object falling within that beam will reflect the radio waves. These reflected waves, in turn, are picked up by the radar equipment and from the picked up reflected waves the location of the object may be pretty definitely and accurately determined.

In order to confuse an enemy who is using radar detection, the opponent may simulate a target by spreading in or throughout a given area objects which will reflect the radio waves. For instance, a plane which is being fired at may release a large number of small reflectors.

One form of such objects heretofore used in quantity has been that known as "chaff" consisting of small resonant antennae for distribution in space in the immediate vicinity of the target. This form of reflector is unsuited to production in quantity due to manufacturing difficulties in the extremely small lengths used for reflecting high radio frequency waves. A further objection to use of chaff, especially at very high frequencies, is the great quantity required to reasonably simulate the equivalent reflecting area or surface of a target such as an airplane. A further objection to use of chaff is that the reflected or reradiated waves are scattered in all directions by the antennae, wherefore only a small portion of the total reflected energy reaches the radar stations, with resulting low efficiency.

It will be seen that, as between the confusion possible by use of these reflectors and the confusion by use of smoke screens, there is a certain general similarity or analogy in that both are used to hide or obscure targets from an enemy and confuse him as to possible definite location. The more complete the curtain presented the greater and more complete will be the confusion in both cases.

The present invention overcomes the above and other objections and provides a device on which the equivalent reflecting area increases as the frequency of the incident radio waves increases. This is due partially to the multiple reflecting surfaces provided by the intersecting planes of the device, as will more fully appear hereinafter. Furthermore, as is known, corner reflectors are far more efficient than chaff because a much higher percentage of the reflected or reradiated energy reaches the radar station.

In order to more clearly disclose the construction, operation, and use of the invention, reference should be had to the accompanying drawings forming part of the present application.

Throughout the several figures of the drawings like reference characters designate the same parts in the different views.

Figure 3:
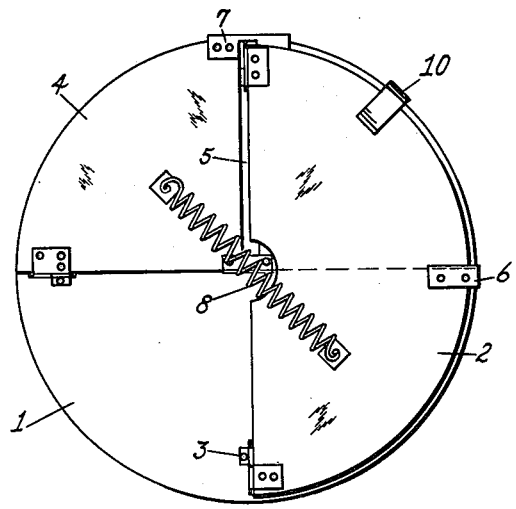
Fig. 3 is a plan view of said reflector, in collapsed condition.
Figure 4:
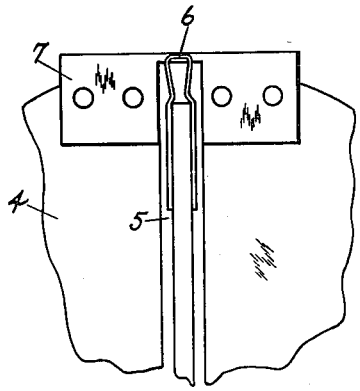
Fig. 4 is an enlarged fragmentary detail view of one of the stops.
Figure 1:
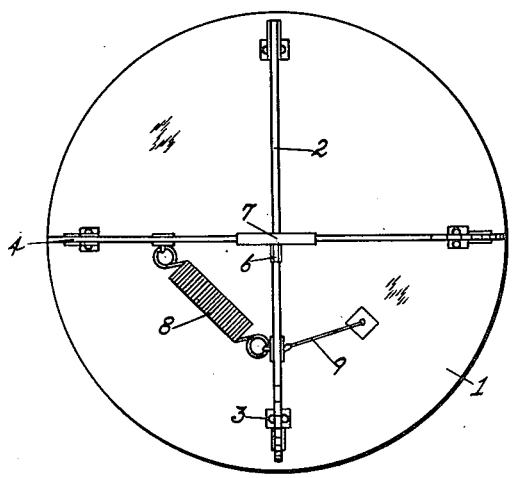
Fig. 1 is a top plan view of a corner reflector embodying the present invention, in operative or open position.
Figure 2:
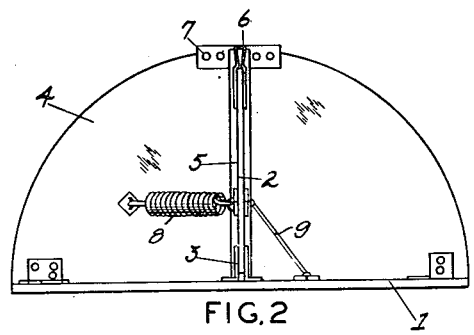
Fig. 2 is a side elevation of Fig. 1.

The material used should be light weight such as relatively rigid corrugated paper board or approximately equivalent. To provide efficient reflecting properties the surfaces should be adequately metalized by spraying, painting or otherwise coating with a conducting material, all as will be well understood.

For maximum efficiency at a given frequency, the dimensions should be large compared to the wave length of the incident wave which it is designed to reflect. Acceptable proportions are approximately 2' diameter for the circular base disc and approximately 1' radius for each of the semicircular vanes, walls or reflecting faces hinged to fold against the base and disposed at right angles to each other along intersecting diameters of the base and, in operative position, presenting four right angle corners disposed about the intersection of said vanes, These dimensions are preferable because they represent a reasonable compromise between the frequency at which these reflectors are effective and the ease of handling and dispensing them. However, as will be well understood, other dimensions may be used.

In constructing the invention, as illustrated in the drawing, a relatively thin, light weight circular disc 1 provides a base of, preferably, about 2' diameter. Diametrically disposed across one face of this base is a semicircular vane, wall or reflecting member 2, hinged thereto at 3 to swing to an operating position perpendicular to the base. A similar vane 4 diametrically disposed across the face of base 1, intersecting vane 2 at right angles at the center of base 1 is similarly hinged to the base. Vane 4, at its longitudinal center, is slotted radially as at 5 to permit it to be swung to and from operative position along vane 2. To limit the swing of the vane 4 to the perpendicular position, beyond which it should not pass for proper and efficient operation, a suitable stop 6 carried by vane 2 at the high point thereof intercepts a yoke 7 carried by vane 4 and bridging slot 5 at its outer end. Thus, as vane 4 swings upwardly it is stopped at its proper operative position.

Erection of vanes 2 and 4 is made automatic by a coil spring 8 under tension and connected at its opposite ends, respectively, to the adjacent faces of adjoining parts of those vanes. In erect or operative position, spring 8 extends across the angle between the adjoining parts of vanes 2 and 4.

Swinging of vane 2 beyond the erect position is prevented by a cord or other flexible device 9 connected, at its opposite ends, respectively, to vane 2 and base 1.

While stop 6 and cord 9 prevent the swinging of vanes 4 and 2, respectively, beyond their operative positions, perpendicular to base 1, spring 8, when they have been erected, yieldingly maintains them continuously in such perpendicular positions.

Vanes 2 and 4 may easily be, successively, swung down to their collapsed or inoperative position, against the tension of spring 8, as illustrated in Fig. 3. In this position, vanes 2 and 4 will be substantially flat against and parallel with base 1, so that the entire corner reflector will occupy only the space of base 1 with very slightly increased thickness corresponding to the added layers of vanes 2 and 4. For transport, storage and like purposes, a clip 10 may be slipped over the superimposed edges of base 1 and vane 2 or any other suitable and easily removable holding means or device may be used. Whatever securing means may be used it should be capable of easy and ready removal or destruction, as by a rip cord, for instance, to avoid otherwise possible interference with operation of the invention in its more important normal uses.

A corner reflector constructed in accordance with this invention provides substantially rigid plane surfaces with three reflecting surfaces for each corner, the surfaces being mechanically maintained in proper operative relationship. It is light weight, compact, cheap and simple to manufacture.

In use, as confusing radar in its attempts to locate an airplane, these corner reflectors may be released or discharged from the said airplane in appropriate numbers, being automatically opened into operative position or condition as they are released.

It is thought that the construction, operation and use of the invention will be clear from the preceding detailed description.

Changes may be made in the construction, arrangement and disposition of the various parts of the invention within the scope of the appended claims without departing from the field of the invention and it is meant to include all such within this application wherein only one preferred form of the invention has been illustrated, purely by way of example and with no thought or intent to, in any degree, limit the invention thereby.

Having thus described our invention what we claim and desire to protect by Letters Patent is:

1. A corner reflector comprising a base reflector member, reflecting vanes swingably mounted thereon, a tension spring connecting said vanes and tending to raise the same to operative positions on said base member and means for limiting the raising movements of said vanes.

2. A corner reflector comprising a base reflector member, a first reflecting vane swingably mounted thereon to move to perpendicular position relatively to said base member, a second reflecting vane swingably mounted on said base member and disposed at right angles to said first vane, and disposed on said base to move to perpendicular position relatively to said base, and a tension spring connecting said vanes and tending to raise the same to and maintain them in perpendicular positions.

3. A corner reflector comprising a base reflector member, a reflector vane disposed wholly on one side of said base member and hinged thereto to swing to and from an operative position normal to said base member, a second reflector vane disposed wholly on the same side of said base member and hinged to said base member to swing to and from an operative position normal to said base member and also normal to and intersecting said first mentioned vane when both vanes are in their operative positions aforesaid, and spring means connecting said hinged reflecting vanes and automatically swinging the same toward such operative positions.

4. A corner reflector comprising a base reflector member, a first reflector vane disposed wholly on one side of said base member, and having one edge disposed substantially diametrically thereof, and hinged thereto to swing substantially about said edge to and from a position perpendicular to said base member, a second reflector vane disposed wholly on the same side of said base member, and having one edge disposed substantially diametrically thereof, and intersecting the first reflecting vane and hinged to the base reflector member to swing substantially about its said edge to and from a position perpendicular to said base member, and spring means connecting said hinged reflector vanes and automatically urging both said hinged reflector vanes to their perpendicular positions relatively to said base member.

5. A corner reflector comprising a base reflector member, a first reflector vane disposed wholly on one side of said base member and hinged thereto to swing to and from an operative position substantially perpendicular thereto, about an axis positioned substantially diametrically thereof, a second reflector vane disposed wholly on the same side of said base member, and intersecting the first mentioned hinged reflector vane substantially perpendicularly thereto when said vanes are both in their operative positions, and hinged to the base reflector member to swing to and from an operative position substantially perpendicular to said base reflector member about an axis positioned substantially diametrically to said base member and substantially perpendicular to the swing axis of the first vane aforesaid, and spring means connecting said hinged reflector vanes and automatically swinging both said hinged reflector vanes to their above described operative positions.

6. A corner reflector comprising a base reflector member, a first reflector vane disposed wholly on one side of said base member and hinged thereto to swing to and from an operative position perpendicular thereto, a second reflector vane disposed wholly on the same side of said base member and hinged thereto to swing to and from an operative position perpendicular thereto, said second vane being provided with a slot freely receiving the first vane, the swing axes of said vanes intersecting each other substantially at right angles, a limit stop carried by the first vane and positioned to engage the second vane when both vanes are in their operative positions to prevent said vanes from swinging beyond their operative positions, and spring means connecting said vanes and adapted to automatically swing them to such operative positions and yieldingly maintain them in such positions.

7. In a corner reflector, a flat base member having a planar reflecting surface on one side, two flat vanes disposed to that side of the base member which is provided with a reflecting surface as aforesaid, each of said vanes having mutually parallel planar reflecting surfaces on its opposite sides and being swingably secured to the base member for movement from an inoperative position close to and substantially parallel to said base member to an operative position perpendicular to said base member, and one of said vanes being provided with a slot through which the other vane may pass to allow the slotted vane to swing to its operative position without interference from the other vane, the swing axes of said two vanes intersecting each other at right angles, said vanes when in their operative positions intersecting along an axis intersecting and perpendicular to the swing axes of both of said vanes, means to urge said vanes from their inoperative positions to their operative positions, said means including a tension spring member connecting said vanes, the opposite ends of which spring member are secured to the vanes respectively at points removed both from their swing axes and their axes which intersect when said vanes are in their operative positions, and stop means to prevent said vanes from swinging beyond their operative positions under the urging of said spring member.

HENRY D. MORRIS.
CONRAD H. ZIERDT, JR.

REFERENCES CITED

The following references are of record in the file of this patent:

UNITED STATES PATENTS

| Number | Name | Date |
| --- | --- | --- |
| 405,354 | Hawk | June 18, 1889 |
| 1,384,014 | Fessenden | July 5, 1921 |
| 1,635,915 | White | July 12, 1927 |
| 2,033,024 | Burden | Mar. 3, 1936 |
| 2,305,665 | Bolsey | Dec. 22, 1942 |
| 2,396,112 | Morgan | Mar. 5, 1946 |
| 2,419,549 | Griesinger et al. | Apr. 29, 1947 |
| 2,432,984 | Budenbom | Dec. 23, 1947 |